United States Patent
Muntasser

(10) Patent No.: US 9,850,925 B2
(45) Date of Patent: Dec. 26, 2017

(54) TUBE MARKING CLAMP

(71) Applicant: Emadeddin Zahri Muntasser, Braintree, MA (US)

(72) Inventor: Emadeddin Zahri Muntasser, Braintree, MA (US)

( * ) Notice: Subject to any disclaimer, the term of this patent is extended or adjusted under 35 U.S.C. 154(b) by 143 days.

(21) Appl. No.: 14/867,097

(22) Filed: Sep. 28, 2015

(65) Prior Publication Data

US 2017/0089512 A1    Mar. 30, 2017

(51) Int. Cl.
*F16L 1/11* (2006.01)
*F16B 2/08* (2006.01)
*E01F 9/00* (2016.01)
*F16B 2/12* (2006.01)
*F16B 2/06* (2006.01)

(52) U.S. Cl.
CPC .................. *F16B 2/08* (2013.01); *E01F 9/00* (2013.01); *F16B 2/12* (2013.01); *F16L 1/11* (2013.01); *F16B 2/065* (2013.01)

(58) Field of Classification Search
CPC .. F16L 1/11; F16L 57/00; G01V 15/00; G09F 3/16; G09F 19/22; G09F 19/228
USPC .............. 116/209; 33/1 G, 1 H; 285/252, 253
See application file for complete search history.

(56) References Cited

U.S. PATENT DOCUMENTS

| | | | |
|---|---|---|---|
| 2,188,710 A | 1/1940 | Giovanini et al. | |
| 2,555,303 A | 6/1951 | Collins | |
| 2,653,836 A | 9/1953 | Christophersen et al. | |
| 3,064,327 A | 11/1962 | Kaplan | |
| 3,099,054 A | 7/1963 | Spiro | |
| 3,110,948 A | 11/1963 | Voss | |
| 3,463,428 A | 8/1969 | Kindorf et al. | |
| 3,567,165 A * | 3/1971 | White ....................... | F16L 3/12 24/274 R |
| 3,694,009 A * | 9/1972 | Phillips ................... | F16L 41/06 285/197 |
| 4,381,020 A | 4/1983 | Daghe et al. | |
| 4,915,055 A * | 4/1990 | Ptashinski ............... | F16L 55/00 116/209 |
| 5,771,835 A * | 6/1998 | Schneider ............... | G09F 11/23 116/209 |
| 6,282,756 B1 * | 9/2001 | van Walraven ....... | F16L 3/1008 24/19 |
| 6,981,567 B2 * | 1/2006 | Stodolka ................ | B60K 13/04 180/296 |
| 7,451,721 B1 * | 11/2008 | Garza et al. ............. | F16L 1/11 116/209 |
| 7,600,483 B2 * | 10/2009 | Myers et al. ............. | F16L 1/11 116/209 |
| 7,712,237 B2 | 5/2010 | Wortley et al. | |

(Continued)

FOREIGN PATENT DOCUMENTS

DE          1245233 B   *  7/1967   ................ F16L 1/00
DE   102009023542 A1 *  12/2010   ................ F16L 1/11
(Continued)

*Primary Examiner* — R. A. Smith
(74) *Attorney, Agent, or Firm* — Lambert & Associates; Gary E. Lambert; David J. Connaughton, Jr.

(57) ABSTRACT

A worm clamp marker holder is provided. The worm clamp is connectable to a buryable element such as a pipe. A marker may be removably attached to the worm clamp by way of a holder connected to the worm clamp, to extend away from the buryable element allowing it to be easily identified once buried.

18 Claims, 4 Drawing Sheets

(56) References Cited

U.S. PATENT DOCUMENTS

| 8,595,992 | B2 | | 12/2013 | May et al. | |
|---|---|---|---|---|---|
| 2007/0018063 | A1 | * | 1/2007 | Lange et al. | F16L 33/08 |
| | | | | | 248/226.11 |
| 2007/0044329 | A1 | * | 3/2007 | Mitchell et al. | F16L 1/11 |
| | | | | | 33/1 E |

FOREIGN PATENT DOCUMENTS

| JP | 2002039436 | A | * | 2/2002 | G06F 19/22 |
|---|---|---|---|---|---|
| KR | 100856694 | B1 | * | 9/2008 | G09F 19/22 |
| WO | 2011091135 | | | 7/2011 | |
| WO | 2011094808 | | | 8/2011 | |

* cited by examiner

TUBE MARKING CLAMP

BACKGROUND OF THE INVENTION

Field of the Invention

The present invention relates generally to marking devices. More particularly the present invention relates to a fastener having a receiving area for a marker that can extend through snow, or other coverings, to identify what is beneath.

Description of Related Art

During heavy snow falls, it is common for structural elements such as pipes, housings, access panels, wiring, components, skylights, and the like to be buried. This burying can be caused by falling leaves, soil, snow, other debris, and the like. When buried, these items may become damaged, often substantially if they cannot be seen. This damage may come from, for example, snow removal devices like shovels, blowers, or plows, or by other tools such as rakes, and the like. Contractors and workers making repairs to roofs or fixtures or shoveling snow can trip on these obstructions or even fall to their death through skylights that can be covered with snow. Punctured gas pipes are a major safety and fire hazard.

Therefore, what is needed is a device that may be quickly and easily attached to these potentially buryable structural elements to extend through any burying material to mark that the structural elements are below.

SUMMARY OF THE INVENTION

The subject matter of this application may involve, in some cases, interrelated products, alternative solutions to a particular problem, and/or a plurality of different uses of a single system or article.

In one aspect, a marker holder is provided. The marker holder has a clamp, and a holder attached to the worm clamp. The clamp may be any clamp capable of attachment to a buried element, such as a pipe clamp. In one embodiment, the clamp may be a worm clamp having a band, a captive screw connected to a first end of the band, and a pattern formed into the band that is interfacable with the captive screw. Upon interfacing of the second end of the band with the captive screw, a rotation of the screw passes the band across the captive screw, thereby tightening the band. A marker is held within the holder, the marker extending away from the worm clamp, such that the marker extends from the structural element that it is attached to.

In another aspect, a worm clamp marker holder assembly is provided. The assembly includes a worm clamp attached to a pipe, a holder attached to the worm clamp, and a marker held by the holder extending away from the pipe. The worm clamp may have a band, a captive screw connected to a first end of the band, and a pattern formed into the band that is interfacable with the captive screw. Upon interfacing of the second end of the band with the captive screw, a rotation of the screw passes the band across the captive screw, thereby tightening the band. A marker is held within the holder, the marker extends away from the worm clamp and the pipe, such that the marker may extend through any burying material, such as snow, leaves, and the like, allowing visible identification of the buried pipe below.

In still another aspect, a method of connecting a worm clamp marker holder assembly to a pipe is provided. The method may begin with obtaining a worm clamp marker holder, which may have a band, a marker holder attached to the band, a captive screw connected to a first end of the band, and a pattern formed into the band that is interfacable with the captive screw. Upon interfacing of the second end of the band with the captive screw, a rotation of the screw passes the band across the captive screw, thereby tightening the band. A marker is also obtained. The worm clamp marker holder may be connected to a pipe or similar structural element, and the marker may be slidably positioned within the holder. This slidable connection of the marker to the holder allows the marker to extend through any burying material, such as snow, leaves, and the like, allowing visible identification of the buried pipe below.

DETAILED DESCRIPTION

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a clamp and marker assembly configured to be fastened or otherwise attached to a buried, or buryable pipe or other elongate element, with the marker extending out of the burying material. In one embodiment, the clamp and marker assembly may have a clamping region formed as a worm clamp (also known in the art as a screw clamp, hose clamp, or band clamp), a holder attached to the worm clamp, and an elongate marker held by the holder extending away from the clamp. The holder may be formed as any number of connection structures, allowing it hold varying marker structure in varying directions. As such, the marker may be able to extend out of the burying material at multiple different angles and directions. However, it should be understood that the present invention may have any number of structures to achieve a similar function without straying from the scope of the invention.

Figure 1:
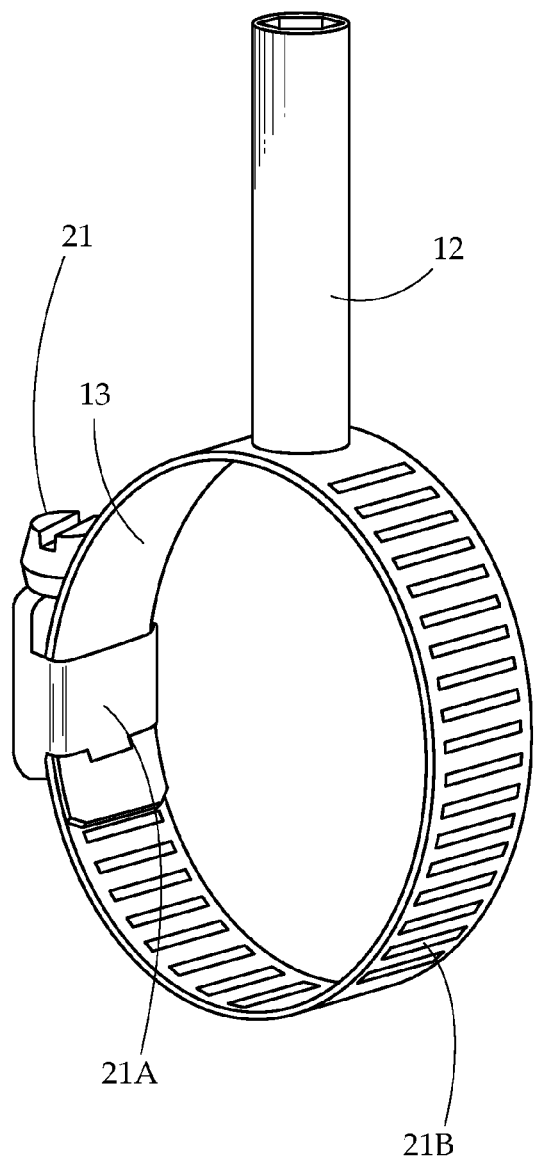
FIG. 1 provides an elevation view of one embodiment of the present invention.
Figure 2:
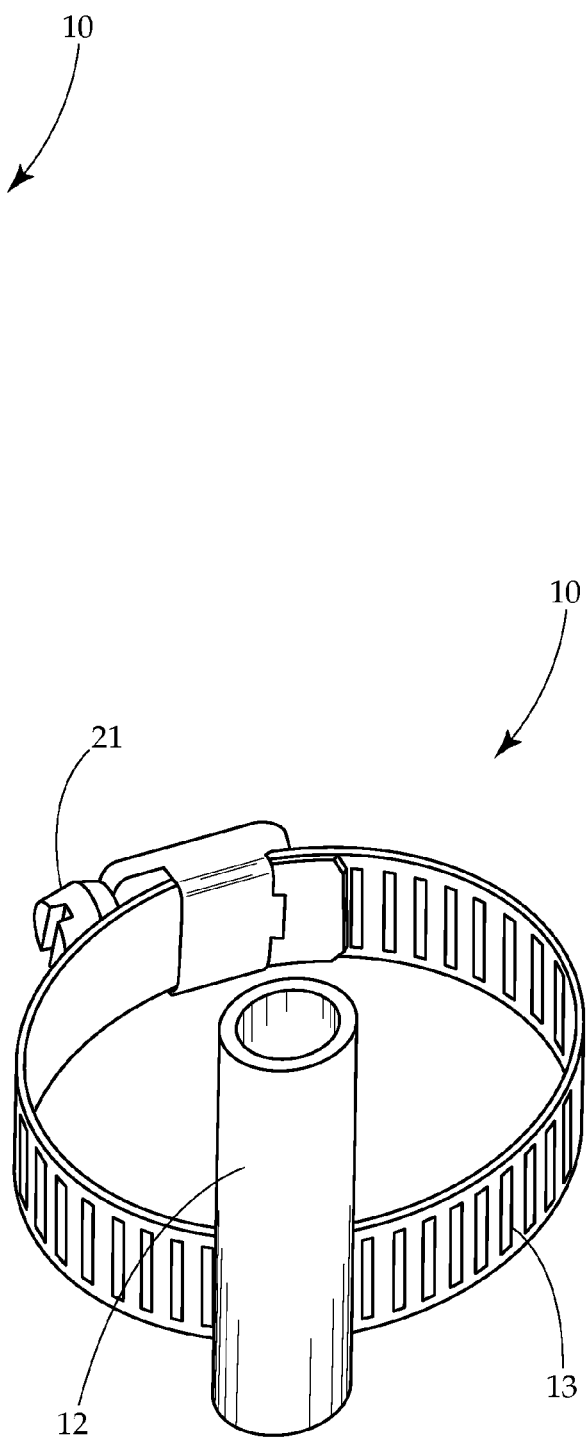
FIG. 2 provides an elevation view of another embodiment of the present invention.
Figure 3:
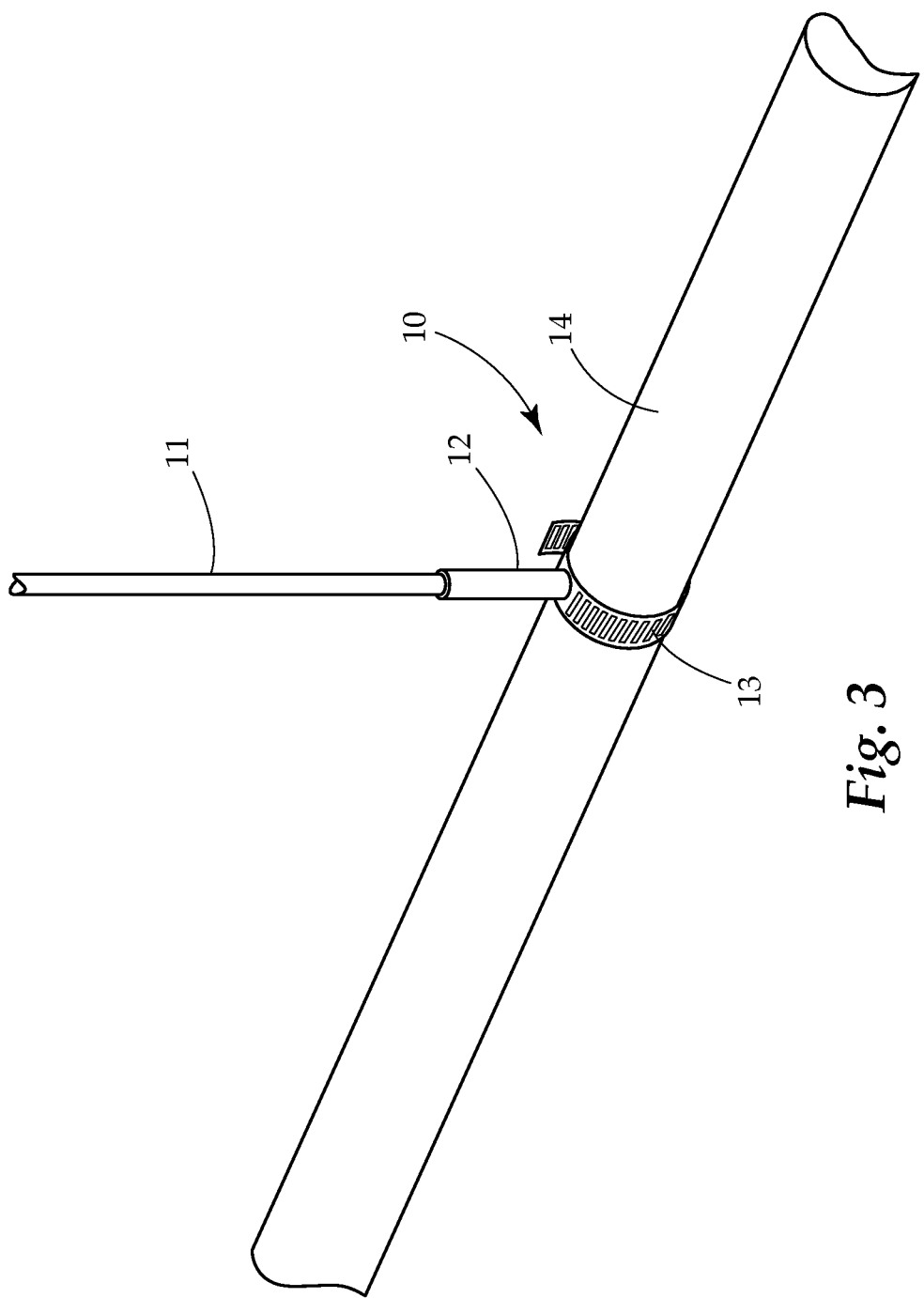
FIG. 3 provides a perspective view of an embodiment of the present invention.

Turning now to FIGS. 1-3, an embodiment of the worm clamp marker holder assembly is provided. The worm clamp marker holder 10 is formed of a worm clamp 13, and a holder 12 fixedly attached to the worm clamp. The worm clamp marker holder 10 can be seen attached to a rounded pipe 14 in FIG. 3. While the clamp is shown in the figures as a worm clamp, it should be understood that any clamp may be used without straying from the scope of the present invention.

The holder 12 is sized and configured to receive and hold a marker 11. In one embodiment, holder 12 may be oriented perpendicularly to the pipe to which it may attach, as shown in FIGS. 1 and 3. In another embodiment, holder 12 may be oriented parallel to the pipe to which it may attach, as shown in FIG. 2. Further, it should be understood that holder 12 may be oriented at any relative direction to the pipe, such that the marker 11 held therein extends away from the pipe or other buryable element and out of any burying material. Holder 12 may be welded, clamped, or otherwise attached to the worm clamp 13 in any manner.

In some embodiment, marker 11, at its proximal end, will fit into the holder 12 until it reaches a bottom or other stop, and cannot pass any further. At its distal end, marker is configured to extend beyond burying material covering the clamp. In still other embodiments, the marker 11 may attach to the holder in other manners such as threaded attachment, clamps, stoppers, and the like. Marker 11 is shown herein as an elongate shaft element. In this particular embodiment, marker 11 is an elongate, unitary marker. Similarly, holder is shown as a rounded cylinder that forms an elongate aperture to receive the marker 11. In other embodiments having differently shaped or configured markers, the holder may similarly adjust. For example, an elongate marker having a square cross section may be held by a holder having any aperture capable of holding this shaped marker (whether it is a circle, square, hex shape or the like).

The worm clamp 13 of the present invention may operate as a traditional worm clamp would. Specifically, the worm clamp 13 has a band 21a into which a screw thread pattern, or other pattern interfacable with a screw has been cut or pressed. One end of the band 21a contains a captive screw 21 attached to the band at 21b. The clamp 13 is put around the pipe, tube, or other buryable element to which it is to be connected, with the loose end being fed into a narrow space between the band 21b and the captive screw 21. When the screw is turned, it acts as a worm drive, pulling the threads of the band 21, causing the band to tighten around the buryable element. When screwed the opposite direction, the band may loosen. Once attached to the pipe 14 or other element, marker 11 may be connected via holder 12, forming the worm clamp marker assembly embodiment shown in FIG. 3.

Figure 4:
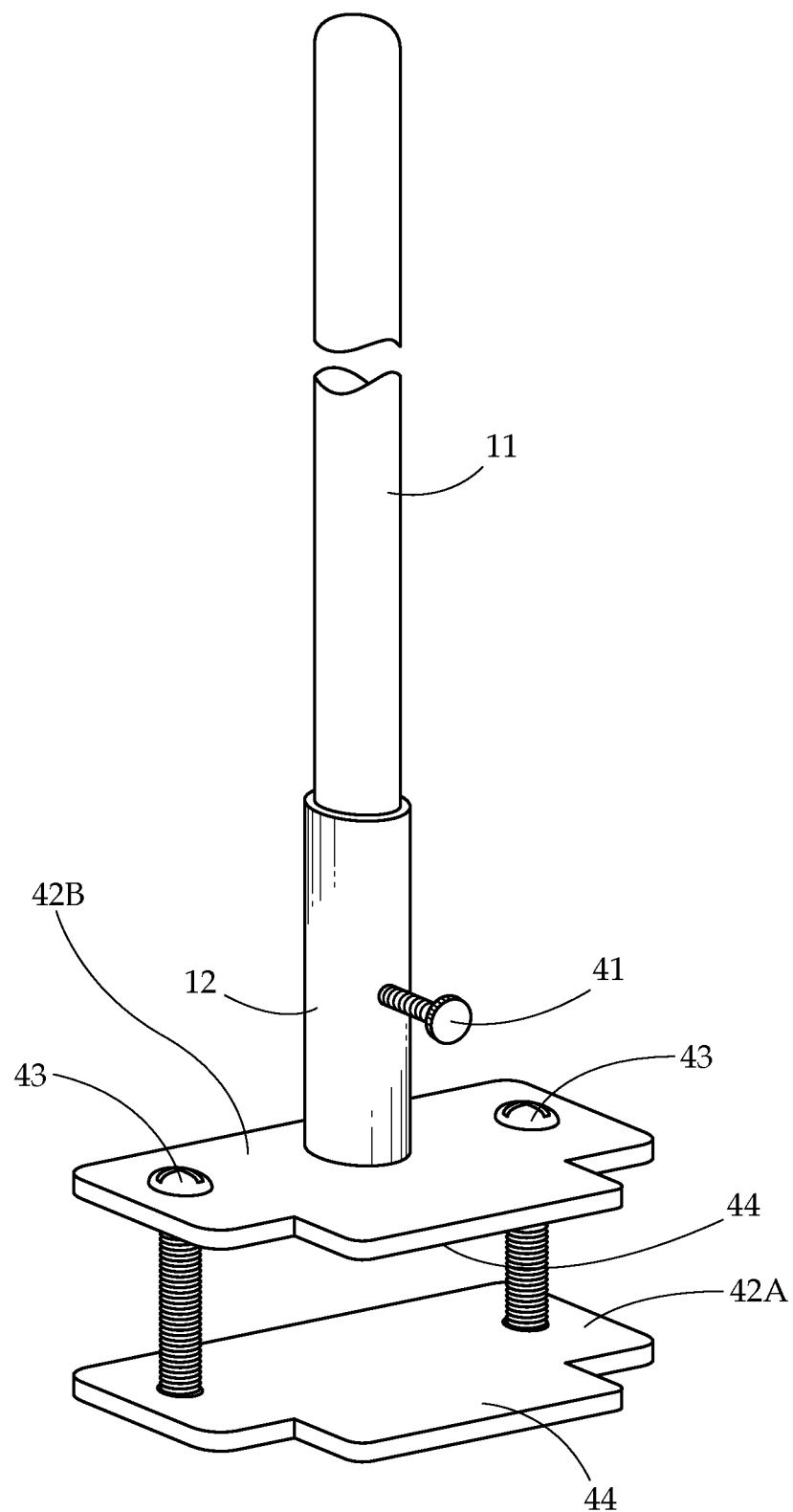
FIG. 4 provides an elevation view of still another embodiment of the present invention.

FIG. 4 provides a view of another embodiment of the present invention. In this view, a flat clamp is shown. The flat clamp has plates 42a and 42b configured to be connected in a clamping fashion by screws 43. An item to which the clamp will be attached is placed between plates 42a and 42b. Holder 12 which is has a tubular shape is attached to upper plate 42b (though could be attached to either). A marker 11 slideably fits into the holder 12 and may be held in place by a screw 41. In some embodiments, one or both plates 42a, 42b may have a lip 44 extending from them. The lip 44 aids in attachment to flat surfaces.

Figure 5:
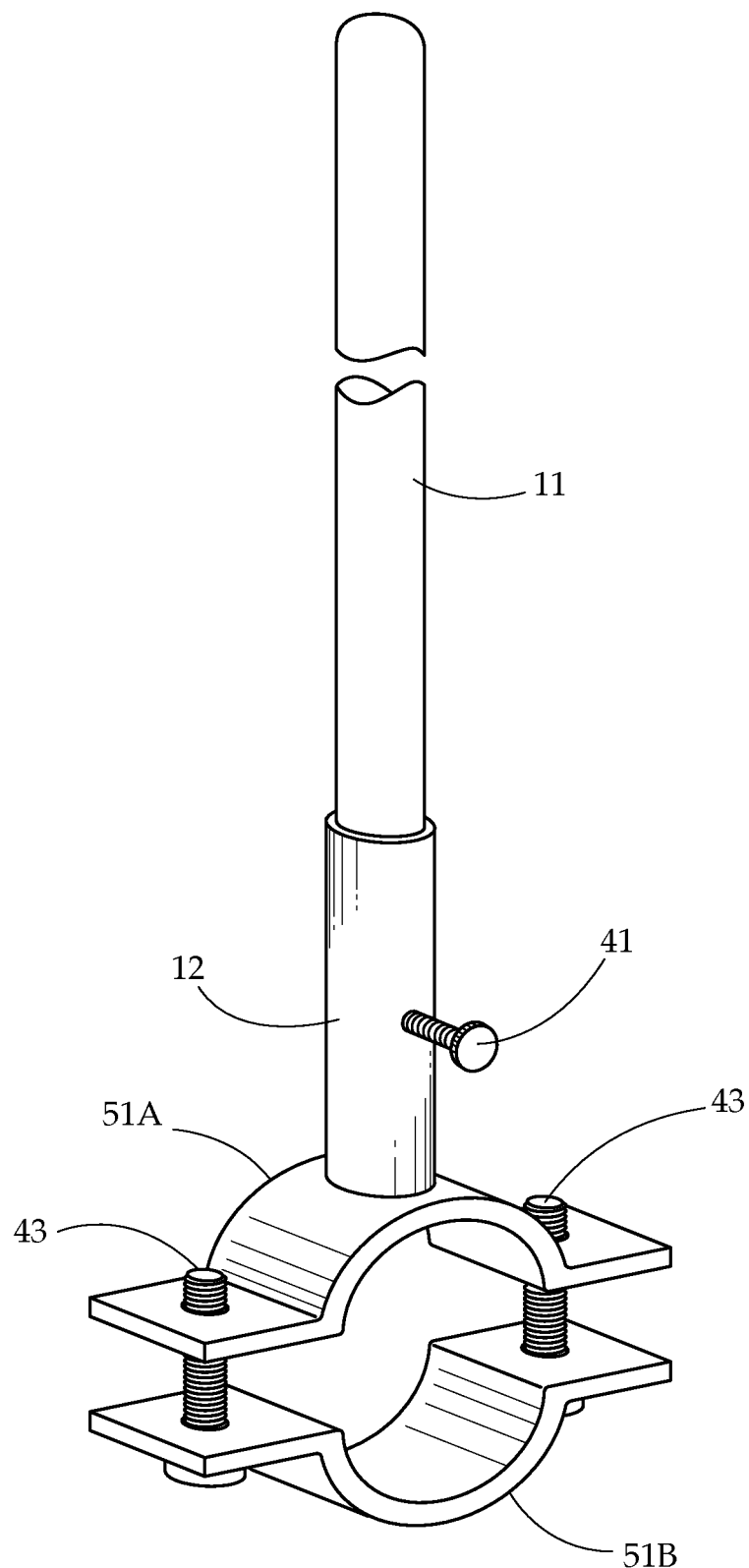
FIG. 5 provides an elevation view of yet another embodiment of the present invention.

FIG. 5 provides a view of another embodiment of the present invention. In this view, a pipe clamp is shown. The pipe clamp has curved plates 51a and 51b configured to be connected in a clamping fashion by screws 43. A pipe to which the clamp will be attached is placed between plates 51a and 51b. The curvature of the plates 51a, 51b should be selected to be roughly sized to match the pipe to which it will be attached, so that the curves may rest on the surface of the pipe. Holder 12 which is has a tubular shape is attached to upper plate 51a (though could be attached to either). A marker 11 slideably fits into the holder 12 and may be held in place by a screw 41.

The worm clamp holder may be made of any material or combination of materials resilient enough to be attached to a surface and to hold a marker in place to extend away from the fastener. Generally, the present invention may be made of metals, plastics, composites, woods, and the like.

The worm clamp holder of the present invention may be used in any manner capable of attaching the fastener to an element and allowing a marker to extend away from the element. In a particular embodiment, the worm clamp may be attached to a pipe and tightened down by screwing (or otherwise rotating) the worm clamp tight. Once secured in place to the pipe, a marker can be inserted into the holder, the marker sized and oriented such that it extends upwards away from the pipe through any burying material.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A marker holder assembly comprising:
   a marker holder comprising:
      a clamp;
      a holder directly attached to the clamp; and
   wherein the clamp is attached to a buried pipe, the buried pipe covered by a burying material, the clamp extending around the pipe;
   a unitary marker held within the holder, the marker extending away from the clamp and the pipe, wherein the holder defines an aperture extending along a lengthwise axis through which the marker is slidably received, the marker having an outer width that is less than an outer width of the holder such that the marker, at its outer width, is slideably received into the aperture; and
   wherein a distal end of the unitary marker extends beyond the burying material, and a proximal end of the unitary marker is within the aperture beneath the burying material.

2. The marker holder assembly of claim 1 wherein the clamp is a worm clamp, the worm clamp comprising a band, a captive screw connected to a first end of the band, and a pattern formed into the band that is interfacable with the captive screw, wherein upon interfacing of the second end of the band with the captive screw, a rotation of the screw passes the band across the captive screw; and
   wherein the holder is attached to the band of the worm clamp.

3. The marker holder assembly of claim 2 wherein the holder is oriented perpendicularly to the worm clamp.

4. The marker holder assembly of claim 2 wherein the holder is oriented parallel to the worm clamp.

5. The marker holder assembly of claim 2 wherein the marker is an elongate shaft.

6. The marker holder assembly of claim 2 wherein the worm clamp and holder are formed of a metal.

7. The marker holder assembly of claim 2 wherein the holder is removably attached to the band.

8. A worm clamp marker holder assembly comprising:
   a worm clamp, the worm clamp comprising a band, a captive screw connected to a first end of the band, and a pattern formed into the band that is interfacable with the captive screw, wherein upon interfacing of the second end of the band with the captive screw, a rotation of the screw passes the band across the captive screw;
   a holder directly attached to the band;
   wherein the worm clamp is attached to a buried pipe, the buried pipe covered by a burying material, the band extending around the pipe;

a unitary marker held within the holder, the marker extending away from the worm clamp and the pipe, wherein the holder defines an aperture extending along a lengthwise axis through which the marker is slidably received, the marker having an outer width that is less than an outer width of the holder such that the marker, at its outer width, is slideably received into the aperture; and wherein a distal end of the unitary marker extends beyond the burying material, and a proximal end of the unitary marker is within the aperture beneath the burying material.

9. The worm clamp marker holder assembly of claim 8 wherein the holder is oriented perpendicularly to the worm clamp.

10. The worm clamp marker holder assembly of claim 8 wherein the holder is oriented parallel to the worm clamp.

11. The worm clamp marker holder assembly of claim 8 wherein the marker is an elongate shaft.

12. The worm clamp marker holder assembly of claim 8 wherein the holder is permanently attached to the band.

13. The worm clamp marker holder assembly of claim 8 wherein the worm clamp and holder are formed of a metal.

14. The worm clamp marker holder assembly of claim 8 wherein the holder is removably attached to the band.

15. A method of connecting the worm clamp marker holder of claim 8 to a pipe comprising the steps of:
    obtaining the worm clamp marker holder;
    obtaining the marker slidably connectable to the holder;
    connecting the worm clamp to a pipe, the connecting comprising placing the second end in communication with the captive screw, and rotating the screw; and
    sliding the marker into the holder, such that the marker extends away from the pipe.

16. The method of claim 15 wherein the holder is oriented perpendicularly to the pipe, such that the marker extends perpendicularly away from the pipe when sliding into the holder.

17. The method of claim 15 wherein the holder is oriented parallel to the pipe, such that the marker extends parallel to a portion of the pipe and away from the pipe when sliding into the holder.

18. The method of claim 15 wherein the step of obtaining the worm clamp marker holder comprises obtaining a metal worm clamp marker holder.

* * * * *